United States Patent
Osako et al.

(10) Patent No.: US 11,031,028 B2
(45) Date of Patent: Jun. 8, 2021

(54) INFORMATION PROCESSING APPARATUS, INFORMATION PROCESSING METHOD, AND RECORDING MEDIUM

(71) Applicant: Sony Corporation, Tokyo (JP)

(72) Inventors: Keiichi Osako, Tokyo (JP); Yuhki Mitsufuji, Tokyo (JP); Kohei Asada, Kanagawa (JP)

(73) Assignee: Sony Corporation, Tokyo (JP)

( * ) Notice: Subject to any disclaimer, the term of this patent is extended or adjusted under 35 U.S.C. 154(b) by 198 days.

(21) Appl. No.: 16/326,956

(22) PCT Filed: Jun. 1, 2017

(86) PCT No.: PCT/JP2017/020507
§ 371 (c)(1),
(2) Date: Feb. 21, 2019

(87) PCT Pub. No.: WO2018/042791
PCT Pub. Date: Mar. 8, 2018

(65) Prior Publication Data
US 2019/0198036 A1   Jun. 27, 2019

(30) Foreign Application Priority Data
Sep. 1, 2016   (JP) .............................. JP2016-170851

(51) Int. Cl.
*G10L 21/00*   (2013.01)
*G10L 21/028*   (2013.01)
(Continued)

(52) U.S. Cl.
CPC ............ *G10L 21/028* (2013.01); *G06F 17/16* (2013.01); *G06N 3/08* (2013.01); *G06N 20/00* (2019.01); *G10L 25/30* (2013.01); *G10L 21/0308* (2013.01)

(58) Field of Classification Search
None
See application file for complete search history.

(56) References Cited

U.S. PATENT DOCUMENTS 9,380,398 B2   6/2016   Mitsufuji
10,015,615 B2   7/2018   Mitsufuji et al.
(Continued)

FOREIGN PATENT DOCUMENTS

JP   2012-163918   8/2012
JP   2014-215461   11/2014

OTHER PUBLICATIONS

E. Marchi, F. Vesperini, F. Weninger, F. Eyben, S. Squartini and B. Schuller, "Non-linear prediction with LSTM recurrent neural networks for acoustic novelty detection," 2015 International Joint Conference on Neural Networks (IJCNN), Killarney, 2015, pp. 1-7, doi: 10.1109/IJCNN.2015.7280757. (Year: 2015).*

(Continued)

*Primary Examiner* — Edgar X Guerra-Erazo
(74) *Attorney, Agent, or Firm* — Wolf, Greenfield & Sacks, P.C.

(57) ABSTRACT

[Object] To provide a sound source separation technology capable of improving the separation performance.
[Solution] An information processing apparatus including: an acquisition section configured to acquire an observation signal obtained by observing a sound; and a sound source separation section configured to separate the observation signal acquired by the acquisition section into a plurality of separated signals corresponding to a plurality of assumed sound sources by applying a non-linear function to a matrix product of an input vector and a coefficient vector corresponding to each of the plurality of sound sources.

12 Claims, 10 Drawing Sheets

(51) Int. Cl.
*G10L 25/30* (2013.01)
*G06N 20/00* (2019.01)
*G06F 17/16* (2006.01)
*G06N 3/08* (2006.01)
*G10L 21/0308* (2013.01)

(56) References Cited

U.S. PATENT DOCUMENTS

| | | | |
|---|---|---|---|
| 10,380,991 | B2 | 8/2019 | Maeno et al. |
| 10,477,309 | B2 | 11/2019 | Mitsufuji |
| 10,524,075 | B2 | 12/2019 | Maeno et al. |
| 10,602,266 | B2 | 3/2020 | Mitsufuji |
| 10,674,255 | B2 | 6/2020 | Maeno et al. |
| 2010/0278357 | A1* | 11/2010 | Hiroe .......... G10L 21/0272 381/111 |
| 2012/0203719 | A1 | 8/2012 | Mitsufuji et al. |
| 2014/0321653 | A1 | 10/2014 | Mitsufuji |
| 2015/0242180 | A1* | 8/2015 | Boulanger-Lewandowski ............ G06N 3/0445 700/94 |
| 2016/0269848 | A1 | 9/2016 | Mitsufuji et al. |
| 2017/0034620 | A1 | 2/2017 | Mitsufuji |
| 2018/0075837 | A1 | 3/2018 | Maeno et al. |
| 2018/0249244 | A1 | 8/2018 | Maeno et al. |
| 2018/0279042 | A1 | 9/2018 | Mitsufuji |
| 2018/0359594 | A1 | 12/2018 | Maeno et al. |

OTHER PUBLICATIONS

E. Cakir, T. Heittola, H. Huttunen and T. Virtanen, "Polyphonic sound event detection using multi label deep neural networks," 2015 International Joint Conference on Neural Networks (IJCNN), Killarney, 2015, pp. 1-7, doi: 10.1109/IJCNN.2015.7280624. (Year: 2015).*

International Search Report and English translation thereof dated Aug. 22, 2017 in connection with International Application No. PCT/JP2017/020507.

Smaragdis et al. "A Neural Network Alternative to Non-Negative Audio Models", arXiv, https://arxiv.org/abs/1609.03296v1, Sep. 13, 2016, pp. 1-10.

U.S. Appl. No. 14/249,780, filed Apr. 10, 2014, Mitsufuji.
U.S. Appl. No. 15/034,170, filed May 3, 2016, Mitsufuji et al.
U.S. Appl. No. 15/302,468, filed Oct. 6, 2016, Mitsufuji.
U.S. Appl. No. 15/516,563, filed Apr. 3, 2017, Mitsufuji.
U.S. Appl. No. 15/564,518, filed Oct. 5, 2017, Maeno et al.
U.S. Appl. No. 15/754,795, filed Feb. 23, 2018, Maeno et al.
U.S. Appl. No. 15/779,967, filed May 30, 2018, Maeno et al.
U.S. Appl. No. 16/863,689, filed Apr. 30, 2020, Maeno et al.

Written Opinion and English translation thereof dated Aug. 8, 2017 in connection with International Application No. PCT/JP2017/020507.

International Preliminary Report on Patentability and English translation thereof dated Mar. 14, 2019 in connection with International Application No. PCT/JP2017/020507.

* cited by examiner

INFORMATION PROCESSING APPARATUS, INFORMATION PROCESSING METHOD, AND RECORDING MEDIUM

CROSS-REFERENCE TO RELATED APPLICATIONS

This application claims the benefit under 35 U.S.C. § 371 as a U.S. National Stage Entry of International Application No. PCT/JP2017/020507, filed in the Japanese Patent Office as a Receiving Office on Jun. 1, 2017, which claims priority to Japanese Patent Application Number JP2016-170851, filed in the Japanese Patent Office on Sep. 1, 2016, each of which is hereby incorporated by reference in its entirety.

TECHNICAL FIELD

The present disclosure relates to an information processing apparatus, an information processing method, and a recording medium.

BACKGROUND ART

There is a sound source separation technology which separates observation signals in which sounds output from a plurality of sound sources is mixed, into separated signals corresponding to sounds output from individual sound sources. Since the sound source separation technology can extract a sound of a target sound source in an environment in which various sounds are mixed, for example, it is useful for improving sound recognition accuracy. Note that a sound source refers to an object which emits sound such as a voice, a musical instrument sound, noise, or the like.

One of these sound source separation technologies is a method of separating sound sources using non-negative value matrix factorization (NMF). For example, a technology of separating sound sources using NMF is disclosed in Patent Document 1.

CITATION LIST

Patent Literature

Patent Literature 1: JP 2014-215461A

DISCLOSURE OF INVENTION

Technical Problem

In the sound source separation technology using NMF, a spectrogram of a sound source is expressed as a matrix product. However, there is a limit to accurately reproducing a spectrum of a separated signal in this expression method, and improvement of separation performance is required.

Therefore, a sound source separation technology capable of improving the separation performance is proposed in the present disclosure.

Solution to Problem

According to the present disclosure, there is provided an information processing apparatus including: an acquisition section configured to acquire an observation signal obtained by observing a sound; and a sound source separation section configured to separate the observation signal acquired by the acquisition section into a plurality of separated signals corresponding to a plurality of assumed sound sources by applying a non-linear function to a matrix product of an input vector and a coefficient vector corresponding to each of the plurality of sound sources.

In addition, according to the present disclosure, there is provided an information processing method which is executed by a processor, including: acquiring an observation signal obtained by observing a sound; and separating the acquired observation signal into a plurality of separated signals corresponding to a plurality of assumed sound sources by applying a non-linear function to a matrix product of an input vector and a coefficient vector corresponding to each of the plurality of sound sources.

In addition, according to the present disclosure, there is provided a recording medium having a program recorded thereon, the program causing a computer to function as: an acquisition section configured to acquire an observation signal obtained by observing a sound; and a sound source separation section configured to separate the observation signal acquired by the acquisition section into a plurality of separated signals corresponding to a plurality of assumed sound sources by applying a non-linear function to a matrix product of an input vector and a coefficient vector corresponding to each of the plurality of sound sources.

Advantageous Effects of Invention

According to the present disclosure as described above, a sound source separation technology capable of improving a separation performance can be provided. Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
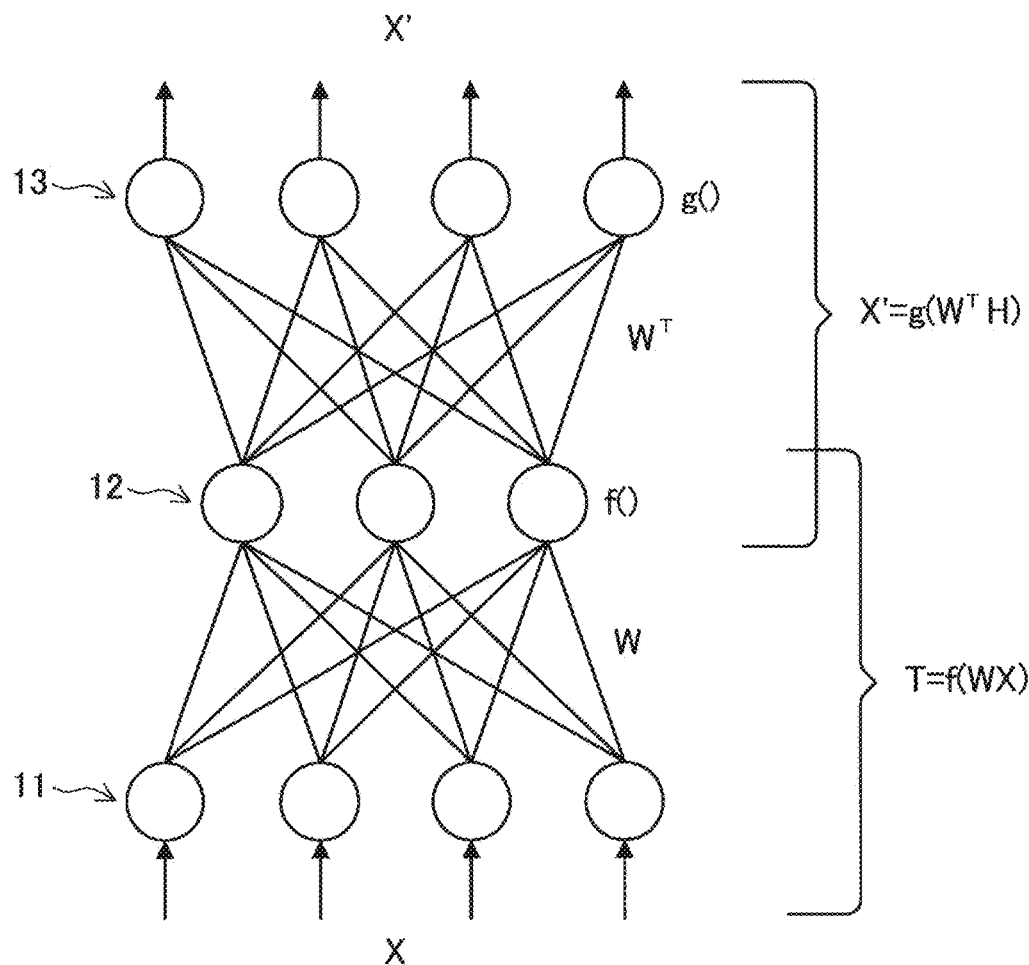
FIG. 1 is a diagram for describing an auto-encoder.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description will be given in the following order.
1. Introduction
1.1. Neural network
1.2. Technical problem
2. Algorithm overview
3. Configuration example
4. Processing flow
5. Hardware configuration example
6. Summary <<1. Introduction>>
<1.1 Neural network>

A neural network is a model in which brain functions are expressed using simulation on a computer. A neural network has a configuration in which nodes simulating neurons are connected to each other by a link simulating a synapse, and obtains a final output while causing an output from a neuron to be transmitted to other connected neurons. An output y from a certain node will be represented by the following equation using inputs $x_1, \ldots,$ and $x_N$ from N nodes which are input sources, weighting coefficients $w_1, \ldots,$ and $w_N$ to respective inputs, a bias $w_0$, and an activation function f.

[Math. 1]

$$y = f\left(\sum_{i=1}^{N} w_i x_i + w_0\right) \quad (1)$$

Here, the weighting coefficient and bias are also collectively referred to as a coefficient (or a coefficient vector). The neural network can be used by learning coefficients using teacher data in advance.

A neural network can have a configuration in which a plurality of layers having one or more nodes is connected. In particular, a neural network having a multi-layer structure is referred to as a deep neural network, and learning using a neural network having a multi-layer structure is also referred to as deep learning. Deep learning which requires an enormous amount of calculation has attracted attention because it has become of practical use due to the improvement in performance of computers in recent years.

One application of a neural network is as an auto-encoder which is also referred to as a self-encoder. An auto-encoder will be described in detail with reference to FIG. 1.

FIG. 1 is a diagram for describing an auto-encoder. The auto-encoder shown in FIG. 1 includes an input layer 11, a hidden layer 12, and an output layer 13. A neural network from the input layer 11 to the hidden layer 12 is also referred to as an encoder. The encoder will be represented by the following equation in which a coefficient is set as W and an activation function is set as f.

[Math. 2]

$$H = f(WX) \quad (2)$$

In addition, a neural network from the hidden layer 12 to the output layer 13 is also referred to as a decoder. The decoder will be represented by the following equation in which a coefficient is set as $W^T$ and an activation function is set as g.

[Math. 3]

$$X' = g(W^T H) \quad (3)$$

In the auto-encoder, learning of the coefficients W and $W^T$ is performed such that an input vector X coincides with an output vector X'. At the time of learning the coefficients, while the encoder and the decoder are used in combination, the encoder and the decoder may be separately used in settings other than learning.

<1.2. Technical problem>

Hereinafter, a sound source separation technology using NMF will be described, and technological problems thereof will be described.

Figure 2:
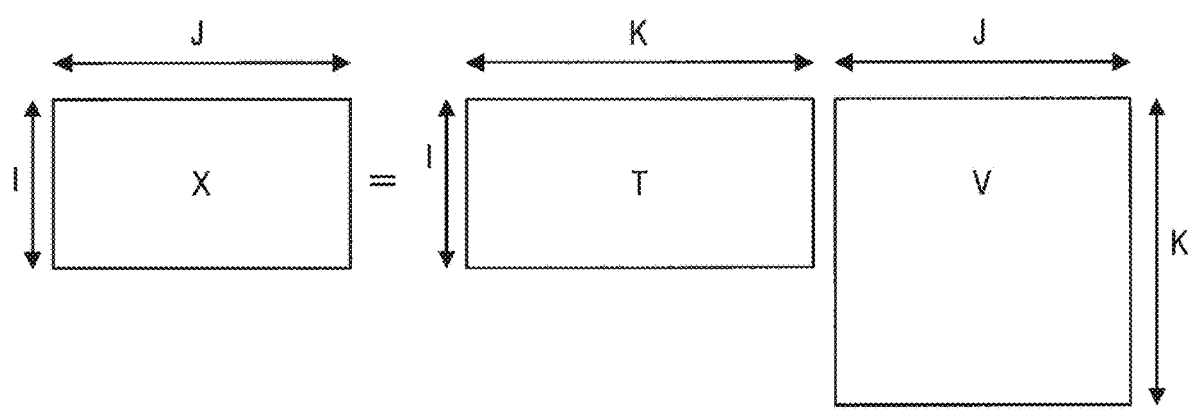
FIG. 2 is a diagram for describing a sound source separation technology using NMF.

FIG. 2 is a diagram for describing the sound source separation technology using NMF. As shown in FIG. 2, in the sound source separation technology using NMF, a spectrogram X of an observation signal is represented by a matrix product of a basis vector T and a combination vector V. Note that the combination vector V can be regarded as a degree of usage of the basis vector T.

A spectrogram is information of a form in which an amplitude spectrum (that is, amplitude gain) is disposed in a time direction, the horizontal axis is time, and the vertical axis is a frequency. That is, a size of the spectrogram X of an observation signal in a frequency direction is I and a size thereof in the time direction is J. In addition, the basis vector T is an I×K matrix, and the combination vector V is a K×J matrix. Since an amplitude spectrum of a sound observation signal has a non-negative value, the spectrogram X can be regarded as a matrix taking only non-negative values. For this reason, frameworks of NMF make it possible to decompose the spectrogram X into two matrixes T and V, and to perform sound source separation using the matrixes.

The number of columns K of the basis vector T means the number of bases. For example, since a musical instrument sound has limited types of sound that can be emitted, it is possible to reproduce the spectrogram X using a matrix product of the combination vector V and the basis vector T having a few bases. However, since a spectrum shape varies greatly depending on individual differences, utterance contents, and the like in speech, the number of bases required for reproduction becomes enormous. If the number of bases increases, not only does a cost of a matrix operation increase, but also it is difficult to calculate appropriate vectors T and V, which results in quality degradation of a separated signal. Furthermore, it is considered that reproduction of the spectrogram X may be difficult in a linear operation of the basis vector T and the combination vector V.

In view of this, the present disclosure provides a technology for improving reproducibility of a separated signal by expressing a spectrogram by a matrix product and a non-linear function using a framework of a neural network.

<<2. Algorithm overview>>

Hereinafter, an overview of an algorithm of a sound source separation technology according to an embodiment of the present disclosure will be described with reference to FIGS. 3 and 4. The sound source separation technology according to the present embodiment is divided into a preliminary learning process and a separation process at the time of a sound source separation. In the following description, it is assumed that there are two sound sources, but there may be three or more sound sources.

Figure 3:
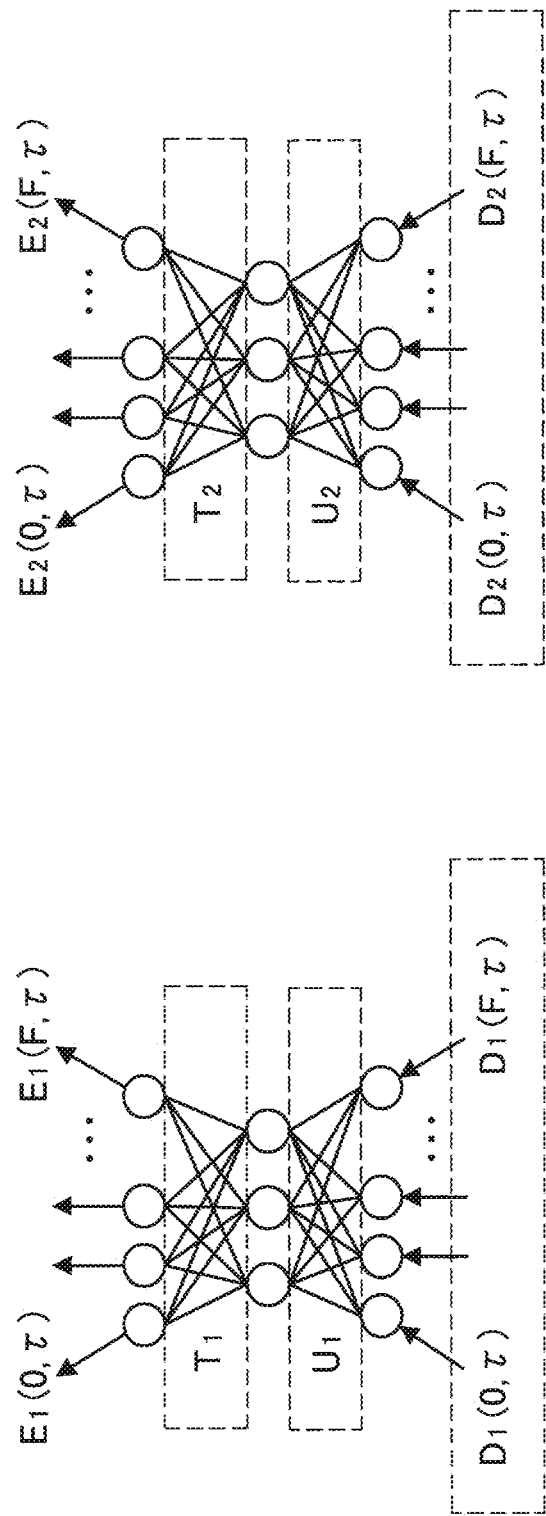
FIG. 3 is a diagram for describing a learning process of the sound source separation technology according to the present embodiment.

FIG. 3 is a diagram for describing the learning process of the sound source separation technology according to the present embodiment. As shown in FIG. 3, an auto-encoder is provided for each assumed sound source. In the learning process, an auto-encoder for each sound source is learned. For example, teacher data $D_1(0, \tau), \ldots,$ and $D_1(F, \tau)$ are input to an auto-encoder corresponding to a first sound source, and an encoder $U_1$ and a decoder $T_1$ are learned such that the teacher data $D_1(0, \tau), \ldots,$ and $D_1(F, \tau)$ coincide with output data $E_1((0, \tau), \ldots,$ and $E_1(F, \tau)$. In addition, teacher data $D_2(0, \tau), \ldots,$ and $D_2(F, \tau)$ are input to an auto-encoder corresponding to a second sound source, and an encoder $U_2$ and a decoder $T_2$ are learned such that the teacher data $D_2(0, \tau), \ldots,$ and $D_2(F, \tau)$ coincide with output data $E_2(0, \tau), \ldots,$ and $E_2(F, \tau)$.

Figure 4:
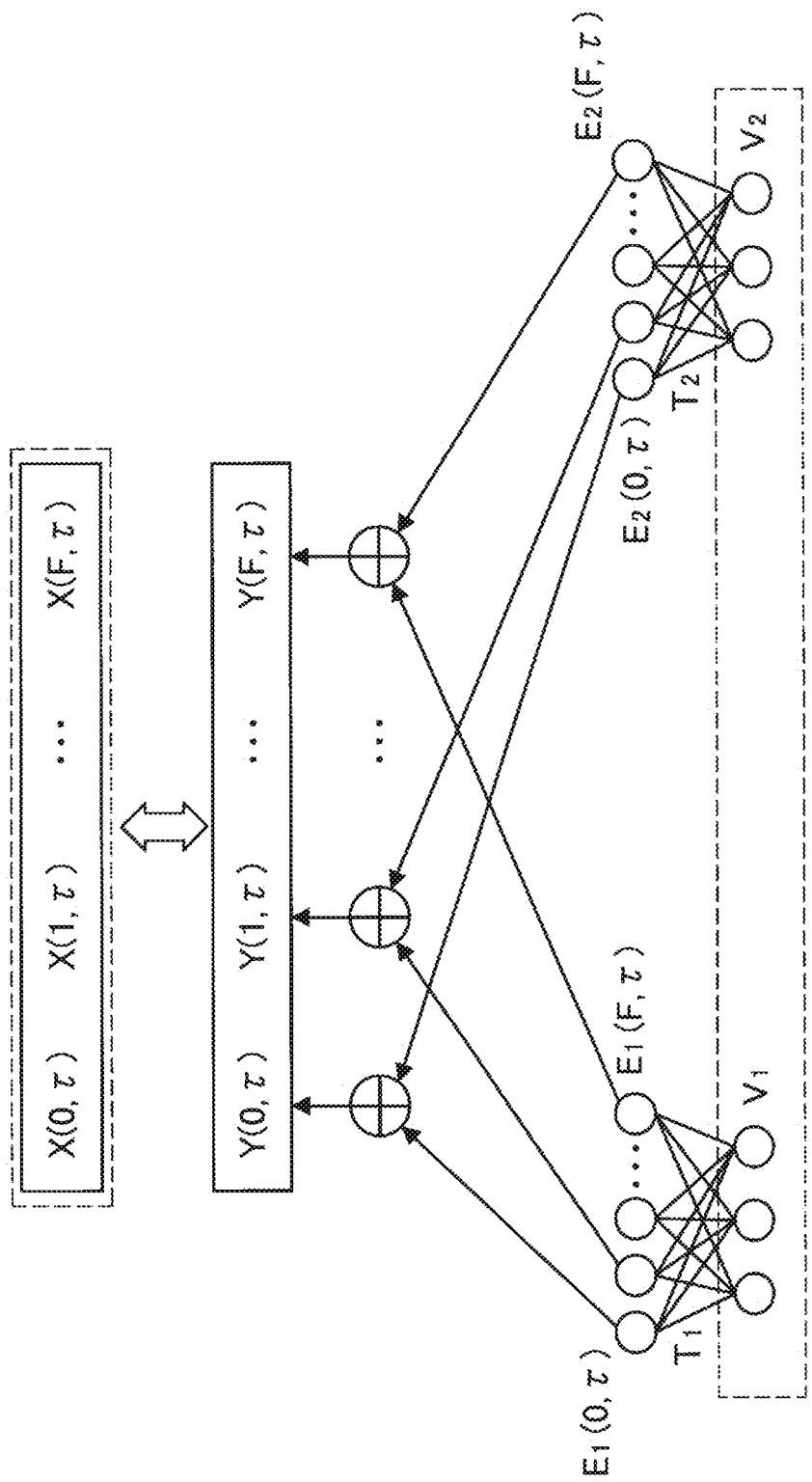
FIG. 4 is a diagram for describing a separation process of the sound source separation technology according to the present embodiment.

FIG. 4 is a diagram for describing a separation process of the sound source separation technology according to the present embodiment. In the separation process, sound source separation is performed using a decoder learned in advance. For example, the signals $E_1(0, \tau), \ldots,$ and $E_1(F, \tau)$ are output by inputting an input value $V_1$ to the decoder $T_1$ corresponding to the first sound source, and the signals $E_2(0, \tau), \ldots,$ and $E_2(F, \tau)$ are output by inputting an input value $V_2$ to the decoder $T_2$ corresponding to the second sound source. Then, the input values $V_1$ and $V_2$ are searched for such that a distance between observation signals $X(0, \tau), \ldots, X(F, \tau)$ and signals $Y(0, \tau), \ldots,$ and $Y(F, \tau)$ obtained by combining these output signals is minimized. Then, separated signals are generated on the basis of the signals $E_1(0, \tau), \ldots,$ and $E_1(F, \tau)$ obtained by inputting the input value $V_1$ for minimizing the distance to the decoder $T_1$ and the signals $E_2(0, \tau), \ldots,$ and $E_2(F, \tau)$ obtained by inputting the input value $V_2$ for minimizing the distance to the decoder $T_2$.

Note that F is an index indicating a frequency domain, and $\tau$ is a frame index. The details of an algorithm will be described below.

<<3. Configuration Example>>

Figure 5:
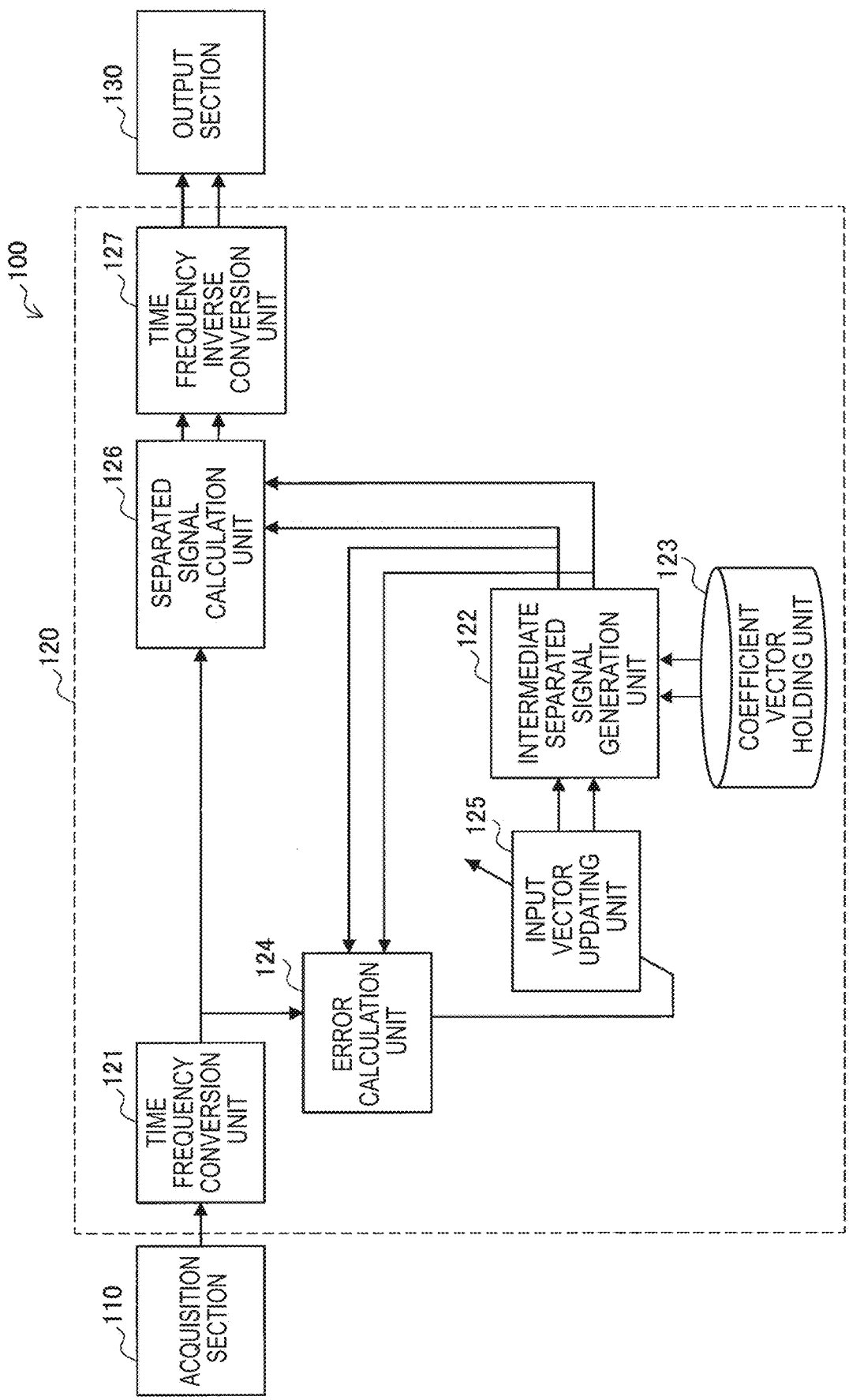
FIG. 5 is a block diagram which illustrates an example of a logical configuration of the information processing apparatus according to the present embodiment.

FIG. 5 is a block diagram illustrating an example of a logical configuration of the information processing apparatus 100 according to the present embodiment. As illustrated in FIG. 5, the information processing apparatus 100 includes an acquisition section 110, a sound source separation section 120, and an output section 130.

(1) Acquisition Section 110

The acquisition section 110 has a function of acquiring an observation signal obtained by observing a sound. Hereinafter, a configuration of the acquisition section 110 will be described with reference to FIG. 6.

Figure 6:
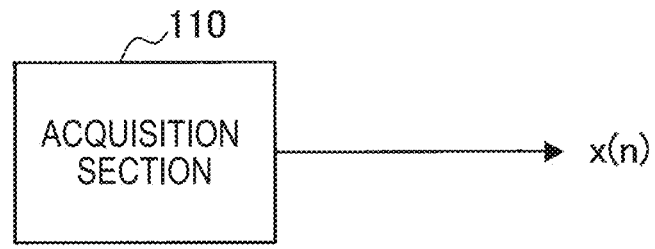
FIG. 6 is a block diagram which illustrates an example of a detailed internal configuration of the information processing apparatus according to the present embodiment.

FIG. 6 is a block diagram illustrating an example of a detailed internal configuration of the information processing apparatus 100 according to the present embodiment. As illustrated in FIG. 6, the acquisition section 110 outputs an observation signal x(n). Here, n represents a sample number of an observation signal.

For example, the acquisition section 110 acquires an observation signal indicating a sound collected by a microphone, an electret capacitor microphone, a micro electro mechanical systems (MEMS) microphone, or the like. In addition, the acquisition section 110 may acquire an observation signal recorded on a recording medium such as a compact disc (CD) or a hard disk drive (HDD), and may also acquire an observation signal received by streaming and the like from a network. The observation signal may also be regarded as an acoustic signal.

(2) Sound Source Separation Section 120

The sound source separation section 120 has a function of separating an observation signal acquired by the acquisition section 110 into a plurality of separated signals corresponding to a plurality of assumed sound sources. As shown in FIG. 5, the sound source separation section 120 includes a time frequency conversion unit 121, an intermediate separated signal generation unit 122, a coefficient vector holding unit 123, an error calculation unit 124, an input vector updating unit 125, a separated signal calculation unit 126, and a time frequency inverse conversion unit 127.

Time Frequency Conversion Unit 121

The time frequency conversion unit 121 has a function of converting an observation signal of a time domain into a signal of a time-frequency domain. Hereinafter, a configuration of the time frequency conversion unit 121 will be described with reference to FIG. 7.

Figure 7:
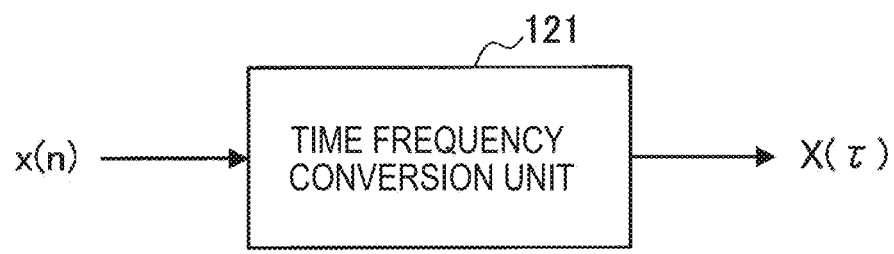
FIG. 7 is a block diagram which illustrates an example of a detailed internal configuration of the information processing apparatus according to the present embodiment.

FIG. 7 is a block diagram illustrating an example of the detailed internal configuration of the information processing apparatus 100 according to the present embodiment. As illustrated in FIG. 7, the time frequency conversion unit 121 receives the observation signal x(n) output from the acquisition section 110, and outputs a converted observation signal $X(\tau)$.

For example, the time frequency conversion unit 121 converts an observation signal in a certain section into a signal of the frequency domain by dividing the observation signal x(n) into frames for each frame size of N samples, applying a window function to an extracted frame, and sequentially applying fast Fourier transform (FFT) thereto. The time frequency conversion unit 121 converts an observation signal of the time domain into a signal of the time-frequency domain by repeatedly performing the conversion while causing a section extracted by S samples to shift in the frame division. For example, the time frequency conversion unit 121 can set the frame size N to 1024 and the shift size S to 512. The observation signal converted into the time-frequency domain will be represented by the following equation.

[Math. 4]

$$X(\tau)=[X(0,\tau), X(1,\tau), \ldots, X(f,\tau), \ldots, X(F,\tau)]^T \quad (4)$$

Here, f and F are indexes indicating frequency domains, and $\tau$ is a frame index.

Intermediate Separated Signal Generation Unit 122

The intermediate separated signal generation unit 122 has a function of generating an intermediate separated signal.

Hereinafter, a configuration of the intermediate separated signal generation unit 122 will be described with reference to FIG. 8.

Figure 8:
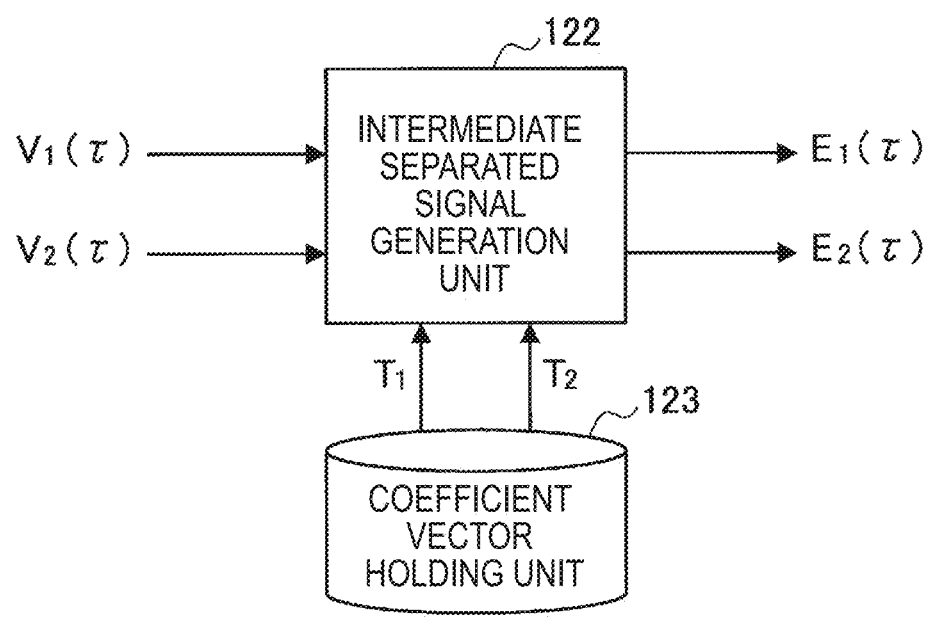
FIG. 8 is a block diagram which illustrates an example of a detailed internal configuration of the information processing apparatus according to the present embodiment.

FIG. 8 is a block diagram illustrating an example of the detailed internal configuration of the information processing apparatus 100 according to the present embodiment. As illustrated in FIG. 8, the intermediate separated signal generation unit 122 receives the coefficient vectors $T_1$ and $T_2$ output from the coefficient vector holding unit 123 and the input vectors $V_1(\tau)$ and $V_2(\tau)$ output from an input vector updating unit 125 to be described below, and outputs intermediate separated signals $E_1(\tau)$ and $E_2(\tau)$. Here, an index with a subscript for each variable means a sound source index. In the following description, as an example, it is assumed that there are two assumed sound sources including one object issuing sound and the other object issuing noise. Of course, the number of sound sources may also be any number of three or more. It is assumed that a variable with "1" means a sound variable, and a variable with "2" means a noise variable. For example, $E_1(\tau)$ is an intermediate separated signal of a sound, and $E_2(\tau)$ is an intermediate separated signal of noise.

In addition, it is desirable that an assumed sound source coincides with a sound source of a sound included in an actual observation signal, but they may not coincide with each other. The intermediate separated signal generation unit 122 may estimate the sound source of a sound included in an observation signal and select a coefficient vector with a learning object of an estimated sound source as a coefficient vector to be referred to.

In addition to a type of a sound source, a coefficient vector can vary depending on a type of an auto-encoder used in learning. For this reason, the intermediate separated signal generation unit 122 generates an intermediate separated signal according to an operation in accordance with a type of a learned auto-encoder. In the following description, an example of the generation of an intermediate separated signal for each auto-encoder type will be described with reference to FIGS. 9 to 11.

FIRST EXAMPLE

Figure 9:
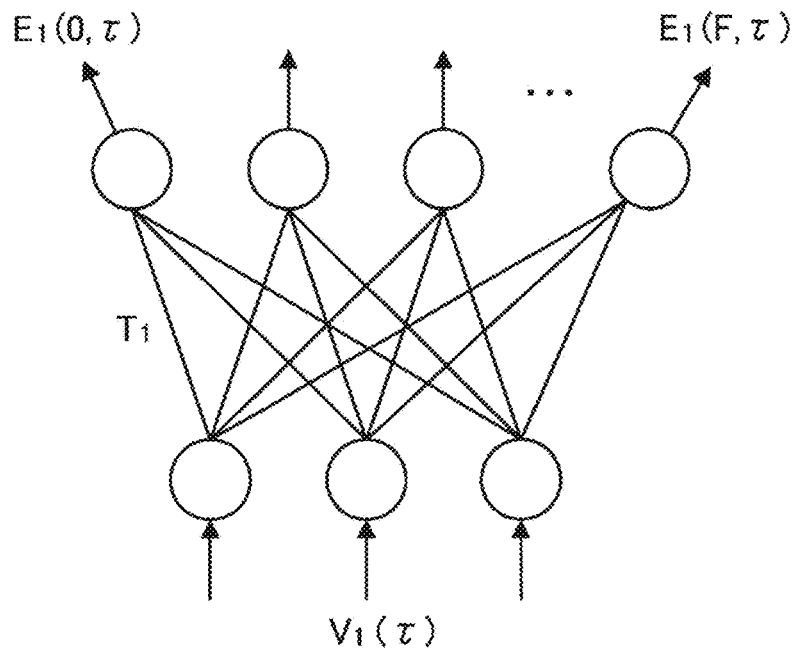
FIG. 9 is a diagram for describing a first example for the generation of the intermediate separated signal according to the present embodiment.

FIG. 9 is a diagram for describing a first example for the generation of the intermediate separated signal according to the present embodiment. In the first example, an auto-encoder in which an activation function is not set is learned. In this case, the intermediate separated signal generation unit 122 generates an intermediate separated signal corresponding to each of the plurality of sound sources by calculating a matrix product of an input vector and a coefficient vector corresponding to each of the plurality of assumed sound sources. The generated intermediate separated signals are represented by the following equation.

[Math. 5]

$$E_1(\tau) = T_1 V_1(\tau)$$

$$E_1(\tau) = T_2 V_2(\tau) \quad (5)$$

SECOND EXAMPLE

Figure 10:
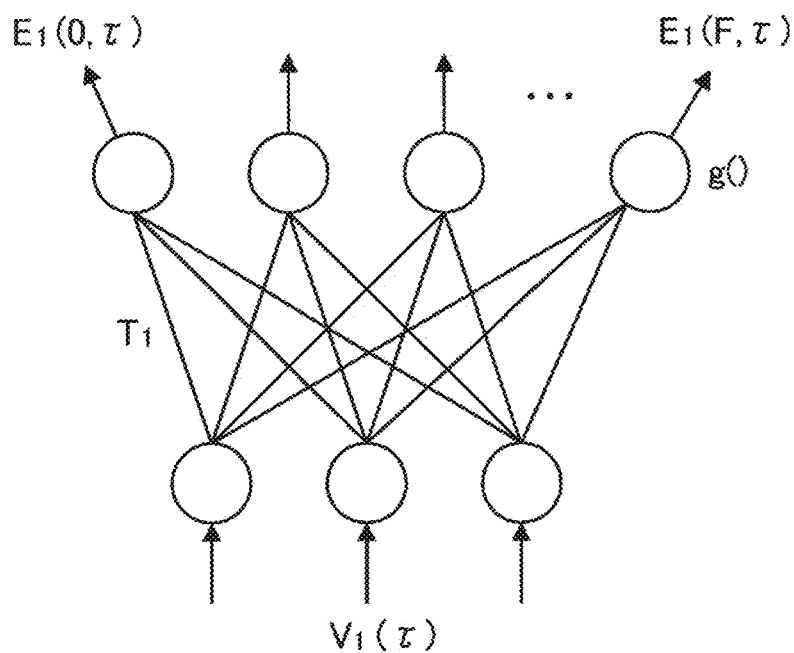
FIG. 10 is a diagram for describing a second example for the generation of the intermediate separated signal according to the present embodiment.

FIG. 10 is a diagram for describing a second example for the generation of an intermediate separated signal according to the present embodiment. In the second example, an auto-encoder in which a non-linear function is set as an activation function is learned. In this case, the intermediate separated signal generation unit 122 generates an intermediate separated signal corresponding to each of the plurality of sound sources by applying a non-linear function to the matrix product of an input vector and a coefficient vector corresponding to each of the plurality of assumed sound sources. The generated intermediate separated signal will be represented by the following equation.

[Math. 6]

$$E_1(\tau) = g(T_1 V_1(\tau))$$

$$E_2(\tau) = g(T_2 V_2(\tau)) \quad (6)$$

Here, $g(\cdot)$ is a non-linear function. As a non-linear function which can be adopted, for example, a sigmoid function, a rectified linear unit (ReLU) function, or the like is considered.

The sigmoid function is a function for compressing and outputting an input value in a case in which the input value is too large or too small. In a case in which the sigmoid function is adopted, reproducibility of an intermediate portion is improved. The sigmoid function will be represented by the following equation.

[Math. 7]

$$f(x_i) = \frac{1}{1 + e^{x_j}} \quad (7)$$

The ReLU function is a function for replacing a negative value with zero, and an output of a non-negative value is secured even if an input value is a negative value. Note that a non-linear function used in the separation process is the same as a non-linear function used in the learning process. The ReLU function will be represented by the following equation.

[Math. 8]

$$f(x_i) = \max(x_j, 0) \quad (8)$$

In addition, any non-linear function such as soft sign, software plus, or wavelet may also be adopted.

According to a second example, the sound source separation section 120 can reproduce a complicated spectrogram of a sound or the like, which is difficult to be reproduced by the linear operation of the basis vector T and the combination vector V using NMF, with higher accuracy by applying a non-linear function. Note that a basis vector in NMF corresponds to a coefficient vector in the present embodiment, and a combination vector in the NMF corresponds to an input vector in the present embodiment. Here, since there is no framework to learn a non-linear operation model to which a non-linear function is applied in NMF, it is difficult to apply a non-linear function to the matrix product of the basis vector and the combination vector. On the other hand, in the present embodiment, learning of the non-linear operation model is enabled by using an auto-encoder in the learning process. For this reason, it is possible to use a non-linear model in the separation process, that is, to apply a non-linear function to the matrix product of a coefficient vector and an input vector in the present embodiment.

In addition, the sound source separation section 120 can reproduce a complicated spectrogram using the small number of coefficient vectors (corresponding to the number of bases of the basis vector in NMF) by applying a non-linear function thereto. Therefore, reduction in an operation amount is expected as compared to the separation technology using NMF.

Note that reproduction accuracy of a separated signal can change according to an applied non-linear function. For example, in a case in which the sigmoid function is applied, a shake of sound pressure can be reduced according to its characteristic.

THIRD EXAMPLE

Figure 11:
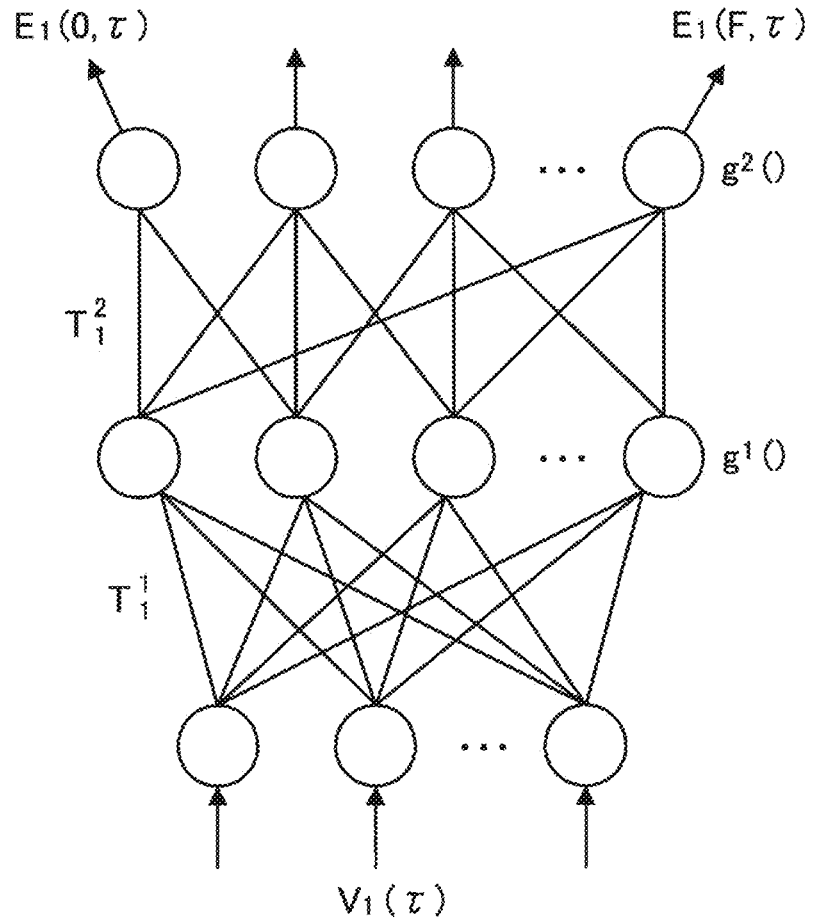
FIG. 11 is a diagram for describing a third example for the generation of the intermediate separated signal according to the present embodiment.

FIG. 11 is a diagram for describing a third example concerning the generation of the intermediate separated signal according to the present embodiment. In the third example, a non-linear function is set as an activation function, and an auto-encoder having a multi-layer structure is learned. Note that it is assumed that the auto-encoder having a multi-layer structure has an encoder and a decoder each having a multi-layer structure of two layers or more. In this case, the intermediate separated signal generation unit 122 repeatedly performs an application of a non-linear function to the matrix product of an input vector and a coefficient vector corresponding to each of the plurality of assumed sound sources, thereby generating an intermediate separated signal corresponding to each of the plurality of sound sources. More accurately, with respect to a plurality of coefficient vectors, the intermediate separated signal generation unit 122 sets a result of the application of a non-linear function to the matrix product of a coefficient vector and an input vector as a new input vector, and generates an intermediate separated signal by recursively repeating the application of a non-linear function to the matrix product of a coefficient vector and an input vector. For example, as shown in FIG. 11, in a case in which the number of layers is two, the generated intermediate separated signal will be represented by the following equation.

[Math. 9]

$$E_1(\tau)=g^2(T_1^2 g^1(T_1^1 V_1(\tau)))$$

$$E_2(\tau)=g^2(T_2^2 g^1(T_2^1 V_2(\tau))) \quad (9)$$

Here, an index with a superscript of each variable means an index of a layer (that is, a column) of the matrix. For example, $T_1^1$ is a coefficient vector of a first layer of a decoder for sound, and $T_1^2$ is a coefficient vector of a second layer of the decoder for sound. In addition, $g^1$ is a non-linear function set as an activation function of the first layer, and $g^2$ is a non-linear function set as an activation function of the second layer.

The auto-encoder may, of course, have a multi-layer structure of three or more layers. For example, in a case of three-layer structure, the generated intermediate separated signal can be represented by the following equation.

[Math. 10]

$$E_1(\tau)=g^3(T_1^3 g^2(T_1^2 g^1(T_1^1 V_1(\tau))))$$

$$E_1(\tau)=g^3(T_2^3 g^2(T_2^2 g^1(T_2^1 V_2(\tau)))) \quad (10)$$

Even if an auto-encoder has a structure of four layers or more, the intermediate separated signal generation unit 122 generates an intermediate separated signal in the same manner as described above.

According to a third example, the sound source separation section 120 can reproduce a complicated spectrogram with higher accuracy by using a decoder having a multi-layer structure. Here, a non-linear function is set as an activation function, and thereby a decoder can have multi-layers. It is because the decoder having a multi-layer structure in a case in which an activation function is not set or in a case in which a linear function is set can be compressed to a decoder having an equivalent single-layer structure.

In the present embodiment, it is assumed that at least the second example or the third example is adopted. That is, in the present embodiment, it is assumed that at least an intermediate separated signal is obtained by applying a non-linear function to the matrix product of a coefficient vector and an input vector. Note that an intermediate separated signal is a signal of the time-frequency domain.

Coefficient Vector Holding Unit 123

The coefficient vector holding unit 123 has a function of holding a coefficient vector of an auto-encoder learned in advance in the learning process described above with reference to FIG. 3. In particular, a held coefficient vector is learned in advance as a decoder of an auto-encoder. Furthermore, a coefficient vector learned in advance as the encoder of an auto-encoder may also be held. The coefficient vector holding unit 123 can include a non-transitory recording medium such as an HDD or a transitory recording medium such as a buffer. The sound source separation section 120 may also have a function as a learning unit configured to execute the learning process described above. In addition, the learning unit may be provided in other devices, and the coefficient vector holding unit 123 may acquire and hold a learned coefficient vector.

A coefficient vector is learned for each assumed sound source. A coefficient vector corresponding to a certain sound source is learned by inputting an observation signal for learning (that is, teacher data) obtained by observing sound output from the sound source to the auto-encoder. Hereinafter, learning by a learning unit will be described in detail.

The learning unit is provided with auto-encoders corresponding to the number of sound sources to be separated, that is, the number of assumed sound sources, and teacher data. For example, in a case in which sound and noise are assumed as a sound source, the learning unit learns an auto-encoder for sound using an observation signal for learning sound, and learns an auto-encoder for noise using an observation signal for learning noise. As an example, the learning process will be described with respect to the auto-encoder for sound. The observation signals for learning sound are set as $D_1(0, \tau), \ldots,$ and $D_1(F, \tau)$, and outputs from the auto-encoder are set as $E_1(0, \tau), \ldots,$ and $E_1(F, \tau)$. The learning unit learns internal coefficients such that $D_1(0, \tau), \ldots,$ and $D_1(F, \tau)$ coincide with $E_1(0, \tau), \ldots,$ and $E_1(F, \tau)$ or a distance (for example, a square error) therebetween is minimized. The learning unit performs the learning on noise in the same manner.

Among the coefficients obtained by learning, a portion connecting from a hidden layer to an output layer is a so-called decoder coefficient. The coefficient vector holding unit 123 holds a decoder coefficient T obtained by learning of the auto-encoder for each sound source as a coefficient vector T as it is. This coefficient vector T is used to generate an intermediate separated signal using the intermediate separated signal generation unit 122.

In addition, among the coefficients obtained by learning, a portion connecting from the input layer to the hidden layer is a so-called encoder coefficient. The coefficient vector holding unit 123 can hold an encoder coefficient U obtained by the learning of an auto-encoder for each sound source. This encoder coefficient U can be used to calculate an initial value of the input vector updated by an input vector updating unit 125 to be described below.

Error Calculation Unit 124

The error calculation unit 124 has a function of calculating an index indicating a relationship between an observation signal and a plurality of separated signals. Hereinafter, a configuration of the error calculation unit 124 will be described with reference to FIG. 12.

Figure 12:
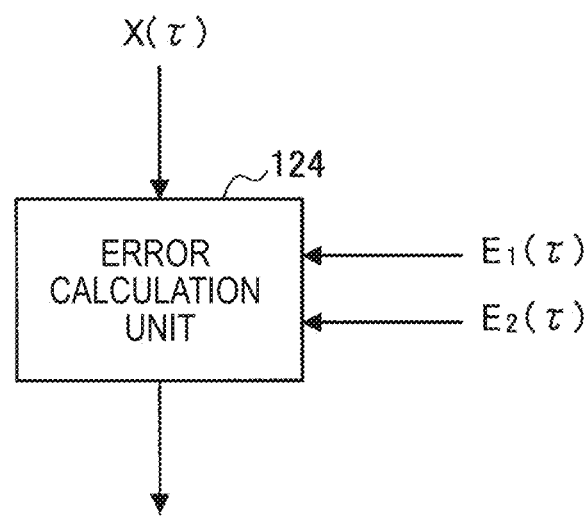
FIG. 12 is a block diagram which illustrates an example of a detailed internal configuration of the information processing apparatus according to the present embodiment.

FIG. 12 is a block diagram illustrating an example of the detailed internal configuration of the information processing apparatus 100 according to the present embodiment. As shown in FIG. 12, the error calculation unit 124 receives the observation signal $X(\tau)$ and the intermediate separated signals $E_1(\tau)$ and $E_2(\tau)$, and outputs an index indicating a relationship between the observation signal $X(\tau)$ and a plurality of separated signals $V(\tau)$. This index may also be, for example, an error between the observation signal and a signal obtained by combining the intermediate separated signals with respect to the plurality of sound sources. In this case, the error calculation unit 124 calculates, for example, an error between the observation signal $(\tau)$ of the time-frequency domain output from the time frequency conversion unit 121 and a sum of the intermediate separated signals $E_1(\tau)$ and $E_2(\tau)$ output from the intermediate separated signal generation unit 122. As a combination method, any method such as a weighted sum, in addition to a sum, may be adopted.

As a distance scale, any distance scale such as a square error, an Itakura-Saito distance, or a Kullback-Leibler distance can be adopted. In a case in which a square error is adopted, an error to be calculated is a square error between the amplitude spectrum of each frequency at each time of an observation signal converted into the time-frequency domain and a sum of the amplitude spectrums of each frequency at each time of a plurality of intermediate separated signals of the time-frequency domain obtained with respect to a plurality of sound sources. In this case, a combined signal $Y(\tau)$ and an error J are represented by the following equation, respectively.

[Math. 11]

$$Y(\tau) = E_1(\tau) + E_2(\tau) \quad (11)$$

$$J = \sum_\tau (\log(X(\tau)) - \log(Y(\tau)))^2$$

$$= \sum_\tau \sum_f (\log(X(f, \tau)) - \log(Y(f, \tau)))^2$$

Input Vector Updating Unit 125

The input vector updating unit 125 has a function of sequentially updating an input vector output to the intermediate separated signal generation unit 122 on the basis of the relationship between an observation signal and a plurality of separated signals. Hereinafter, a configuration of the input vector updating unit 125 will be described with reference to FIG. 13.

Figure 13:
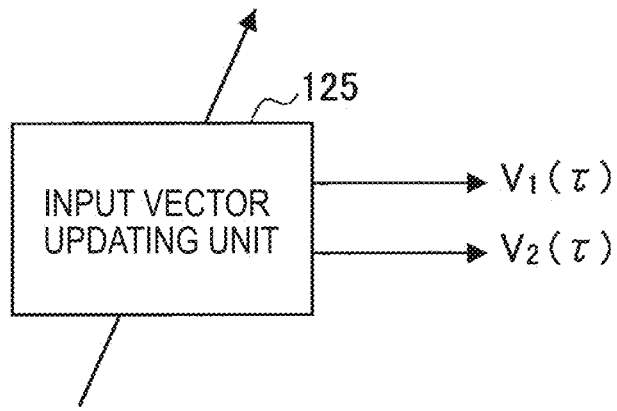
FIG. 13 is a block diagram which illustrates an example of a detailed internal configuration of the information processing apparatus according to the present embodiment.

FIG. 13 is a block diagram illustrating an example of the detailed internal configuration of the information processing apparatus 100 according to the present embodiment. As illustrated in FIG. 13, the input vector updating unit 125 updates and outputs the input vectors $V_1(\tau)$ and $V_2(\tau)$ output to the intermediate separated signal generation unit 122. Specifically, the input vector updating unit 125 sequentially updates the input vector such that the error between the observation signal and the signal obtained by combining the intermediate separated signals with respect to the plurality of sound sources, which is calculated by the error calculation unit 124, is decreased. For example, the input vector updating unit 125 may also sequentially update the input vector using optimization techniques such as a least squares method.

The input vector updating unit 125 may generate initial values of the input vectors $V_1(\tau)$ and $V_2(\tau)$ using a random number. In addition, the input vector updating unit 125 may generate the initial values of the input vectors $V_1(\tau)$ and $V_2(\tau)$ by inputting the observation signal to the encoder which is learned together with the decoder. Since the initial values closer to optimal solutions are generated by the latter than the former, it is possible to reduce the number of updates. In the case of the latter, the initial values are represented by the following equation.

[Math. 12]

$$V_1(\tau) = U_1 X(\tau)$$

$$V_2(\tau) = U_2 X(\tau) \quad (12)$$

Here, $U_1$ is a coefficient vector of an encoder for sound, and $U_2$ is a coefficient vector of an encoder for noise.

Separated Signal Calculation Unit 126

The separated signal calculation unit 126 has a function of calculating a separated signal on the basis of the intermediate separated signals and the observation signal. Hereinafter, a configuration of the separated signal calculation unit 126 will be described with reference to FIG. 14.

Figure 14:
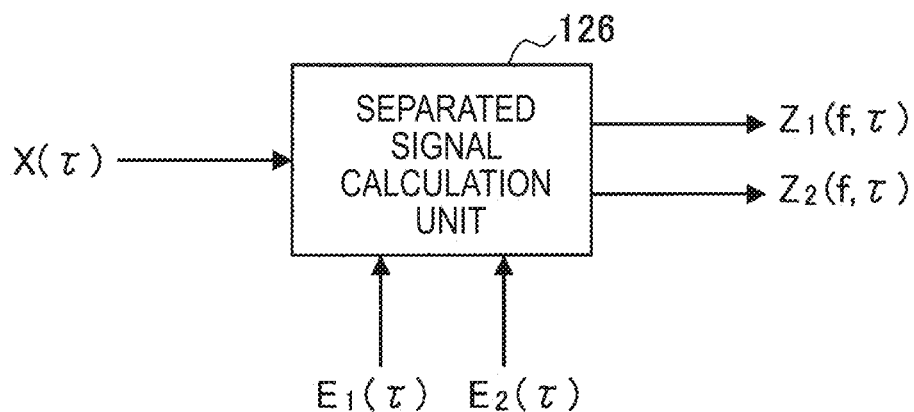
FIG. 14 is a block diagram which illustrates an example of a detailed internal configuration of the information processing apparatus according to the present embodiment.

FIG. 14 is a block diagram illustrating an example of the detailed internal configuration of the information processing apparatus 100 according to the present embodiment. As illustrated in FIG. 14, the separated signal calculation unit 126 receives the observation signal $X(\tau)$, and the intermediate separated signals $E_1(\tau)$ and $E_2(\tau)$, and outputs separated signals $Z_1(f, \tau)$ and $Z_2(f, \tau)$.

Specifically, the separated signal calculation unit 126 calculates a signal obtained by multiplying the amplitude spectrum of each frequency at each time of the observation signal converted into the time-frequency domain by a value, obtained by dividing the amplitude spectrums of each frequency at each time of the intermediate separated signals of the time-frequency domain by the sum of the amplitude spectrums of each frequency at each time of a plurality of intermediate separated signals obtained with respect to the plurality of sound sources, as a separated signal. More simply, the separated signal calculation unit 126 calculates each separated signal by obtaining a ratio of the intermediate separated signal for each time frequency grid, and multiplying the observation signal of the same grid by this ratio. A calculated separated signal will be represented by the following equation.

[Math. 13]

$$Z_1(f, \tau) = \frac{E_1(f, \tau)}{E_1(f, \tau) + E_2(f, \tau)} X(f, \tau) \quad (13)$$

$$Z_2(f, \tau) = \frac{E_2(f, \tau)}{E_1(f, \tau) + E_2(f, \tau)} X(f, \tau)$$

In addition, the separated signal may be represented by the following equation.

[Math. 14]

$$Z_1(\tau)=[Z_1(0,\tau),Z_1(1,\tau),\ldots,Z_1(f,\tau),\ldots,Z_1(F,\tau)]^T$$

$$Z_2(\tau)=[Z_2(0,\tau),Z_2(1,\tau),\ldots,Z_2(f,\tau),\ldots,Z_2(F,\tau)]^T \quad (14)$$

As a modification, the separated signal calculation unit 126 may output an intermediate separated signal of the time-frequency domain as a separated signal as it is. In this case, it is possible to reduce an amount of calculation as compared to a method using the ratio described above.

Time Frequency Inverse Conversion Unit 127

The time frequency inverse conversion unit 127 has a function of generating a final separated signal by converting the separated signal output from the separated signal calculation unit 126, which is a signal of the time-frequency domain, into a signal of the time domain. Hereinafter, a configuration of the time frequency inverse conversion unit 127 will be described with reference to FIG. 15.

Figure 15:
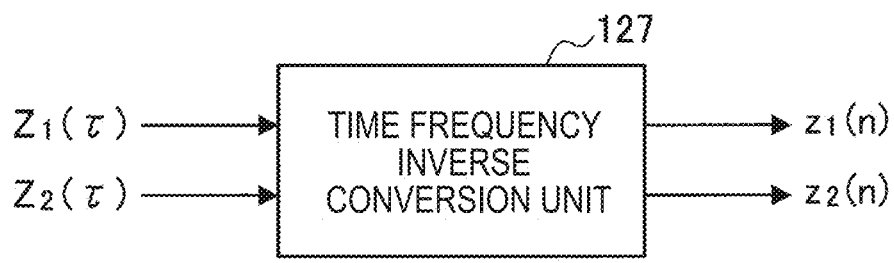
FIG. 15 is a block diagram which illustrates an example of a detailed internal configuration of the information processing apparatus according to the present embodiment.

FIG. 15 is a block diagram illustrating an example of the detailed internal configuration of the information processing apparatus 100 according to the present embodiment. As illustrated in FIG. 15, the time frequency inverse conversion unit 127 receives the separated signal $Z_1(f,\tau)$ and $Z_2(f,\tau)$, and outputs a separated signal $z_1(n)$ and $z_2(n)$.

Specifically, the time frequency inverse conversion unit 127 generates a separated signal of the time domain by superimposing signals of N samples obtained by applying inverse FFT to a separated signal for each frame τ while causing them to shift by S samples. The time frequency inverse conversion unit 127 performs such conversion processing for each separated signal.

As described above, each component of the sound source separation section 120 has been described.

(3) Output Section 130

The output section 130 has a function of outputting a separated signal obtained by the sound source separation section 120. For example, the output section 130 may output a separated signal to a speaker, an earphone, or the like and cause it to be reproduced. In addition, the output section 130 may output a separated signal to a recording medium such as an HDD and cause it to be recorded, and may also output a separated signal to a network interface and cause it to be transmitted to other devices on a network.

<<4. Processing flow>>

The configuration examples of the information processing apparatus 100 according to the present embodiment have been described as described above. Subsequently, an example of a flow of processing executed in the information processing apparatus 100 according to the present embodiment will be described with reference to FIG. 16.

Figure 16:
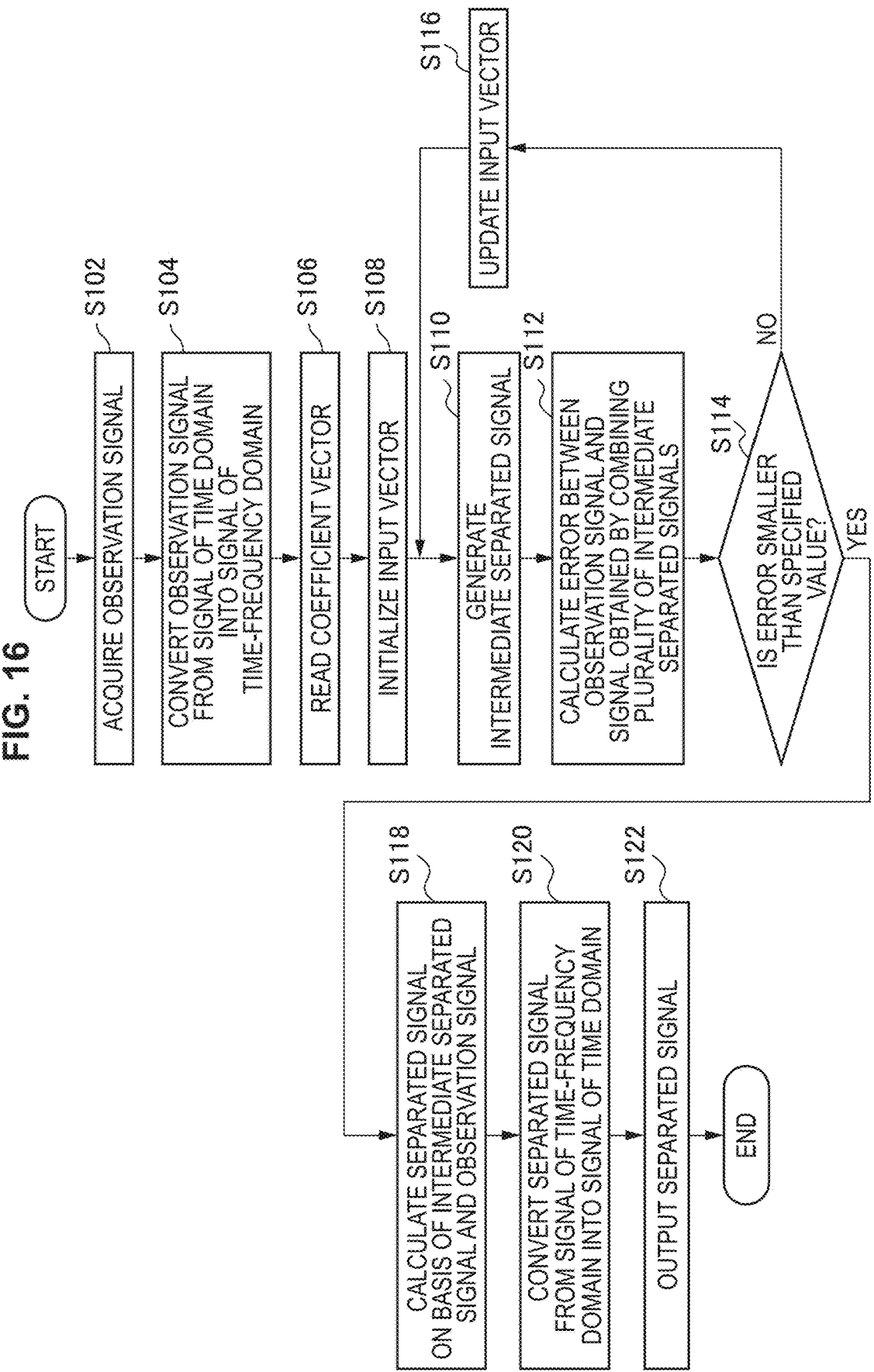
FIG. 16 is a flowchart which illustrates an example of a flow of the sound source separation processing executed in the information processing apparatus according to the present embodiment.

FIG. 16 is a flowchart which shows an example of a flow of sound source separation processing executed in the information processing apparatus 100 according to the present embodiment.

As shown in FIG. 16, first, the acquisition section 110 acquires an observation signal (step S102). Here, an acquired observation signal is a signal of the time domain.

Next, the time frequency conversion unit 121 converts the acquired observation signal from a signal of the time domain into a signal of the time-frequency domain (step S104). More specifically, the time frequency conversion unit 121 converts an observation signal in a certain section into a signal of the frequency domain by dividing the acquired observation signal into frames, applying a window function thereto, and sequentially applying FFT thereto. The time frequency conversion unit 121 converts an observation signal of the time domain into a signal of the time-frequency domain by repeatedly performing the conversion while causing an extracted section to shift.

Next, the intermediate separated signal generation unit 122 reads a coefficient vector held by the coefficient vector holding unit 123 (step S106). More specifically, the intermediate separated signal generation unit 122 reads a previously learned coefficient vector from the coefficient vector holding unit 123 as a decoder of an auto-encoder corresponding to each of the plurality of assumed sound sources.

Next, the input vector updating unit 125 initializes an input vector (step S108). For example, the input vector updating unit 125 may generate an initial value of the input vector using a random number. In addition, the input vector updating unit 125 may also generate the initial value of the input vector by inputting an observation signal to an encoder learned together with a decoder.

Next, the intermediate separated signal generation unit 122 generates an intermediate separated signal (step S110). For example, the intermediate separated signal generation unit 122 generates an intermediate separated signal by applying a non-linear function to the matrix product of an input vector and a coefficient vector corresponding to each of the plurality of assumed sound sources. Note that the second example or the third example described above is assumed to be adopted.

Next, the error calculation unit 124 calculates an error between an observation signal and a signal obtained by combining a plurality of intermediate separated signals (step S112). For example, the error calculation unit 124 calculates a square error between an observation signal of the time-frequency domain and a sum of the plurality of intermediate separated signals.

Next, the sound source separation section 120 determines whether or not a calculated error is smaller than a specified value (that is, a threshold value) (step S114).

In a case in which it is determined that the calculated error is not smaller than the specified value (No in step S114), the input vector updating unit 125 updates the input vector (step S116). Thereafter, the processing returns to step S110 again.

In a case in which it is determined that the calculated error is smaller (YES in step S114), the separated signal calculation unit 126 calculates a separated signal on the basis of an intermediate separated signal and an observation signal (step S118). For example, the separated signal calculation unit 126 obtains a ratio of the intermediate separated signal for each time frequency grid, and calculates each separated signal by multiplying the observation signal of the same grid by the ratio.

Next, the time frequency inverse conversion unit 127 converts a separated signal which is a signal of the time-frequency domain into a signal of the time domain (step S120). More specifically, the time frequency inverse conversion unit 127 generates a separated signal of the time domain by superimposing signals of the time domain obtained by applying inverse FFT to a separated signal for each frame while causing them to shift.

Then, the output section 130 outputs the separated signal of the time domain for each generated sound source (step S122).

<<5. Hardware Configuration Example>>

Figure 17:
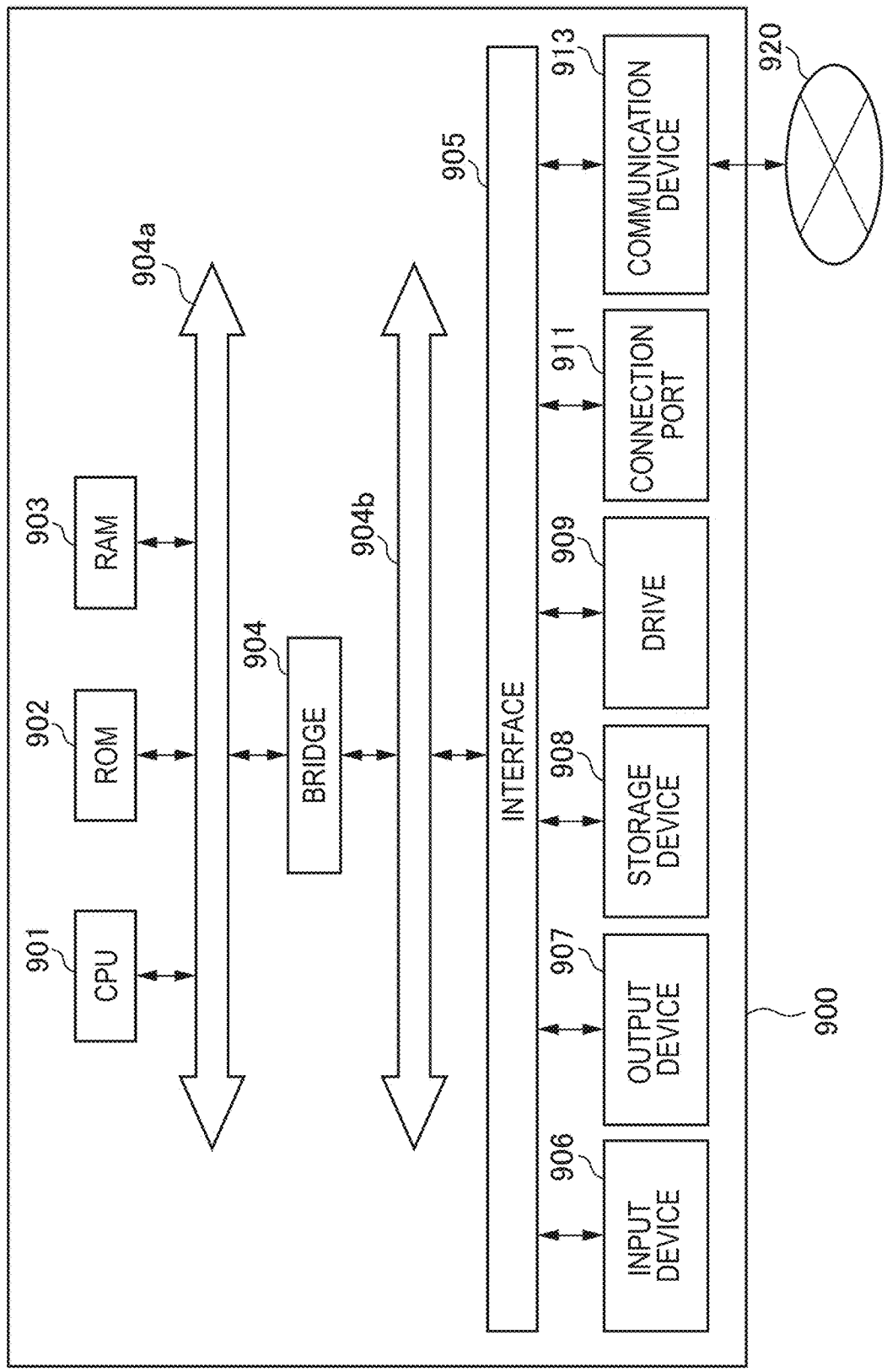
FIG. 17 is a block diagram which illustrates an example of a hardware configuration of the information processing apparatus according to the present embodiment.

Finally, a hardware configuration of an information processing apparatus according to the present embodiment will be described with reference to FIG. 17. FIG. 17 is a block diagram illustrating an example of the hardware configuration of the information processing apparatus according to the present embodiment. Meanwhile, an information processing apparatus 900 illustrated in FIG. 17 may realize the information processing apparatus 100 illustrated in FIG. 5, for example. Information processing by the information processing apparatus 100 according to the present embodiment is realized according to cooperation between software and hardware described below.

As illustrated in FIG. 17, the information processing apparatus 900 includes a central processing unit (CPU) 901, a read only memory (ROM) 902, a random access memory (RAM) 903 and a host bus 904a. In addition, the information processing apparatus 900 includes a bridge 904, an external bus 904b, an interface 905, an input device 906, an output device 907, a storage device 908, a drive 909, a connection port 911 and a communication device 913. The information processing apparatus 900 may include a processing circuit such as an electric circuit, a DSP or an ASIC instead of the CPU 901 or along therewith.

The CPU 901 functions as an arithmetic processing device and a control device and controls the overall operation in the information processing apparatus 900 according to various programs. Further, the CPU 901 may be a microprocessor. The ROM 902 stores programs, operation parameters and the like used by the CPU 901. The RAM 903 temporarily stores programs used in execution of the CPU 901, parameters appropriately changed in the execution, and the like. The CPU 901 can form, for example, the sound source separation section 120 illustrated in FIG. 5, more specifically, the time frequency conversion unit 121, the intermediate separated signal generation unit 122, the error calculation unit 124, the input vector updating unit 125, the separated signal calculation unit 126, and the time frequency inverse conversion unit 127.

The CPU 901, the ROM 902 and the RAM 903 are connected by the host bus 904a including a CPU bus and the like. The host bus 904a is connected with the external bus 904b such as a peripheral component interconnect/interface (PCI) bus via the bridge 904. Further, the host bus 904a, the bridge 904 and the external bus 904b are not necessarily separately configured and such functions may be mounted in a single bus.

The input device 906 is realized by a device through which a user inputs information, such as a mouse, a keyboard, a touch panel, a button, a microphone, a switch, and a lever. In addition, the input device 906 may be a remote control device using infrared ray or other electric waves or external connection equipment such as a mobile phone or a PDA corresponding to operation of the information processing apparatus 900, for example. Furthermore, the input device 906 may include an input control circuit or the like which generates an input signal on the basis of information input by the user using the aforementioned input means and outputs the input signal to the CPU 901, for example. The user of the information processing apparatus 900 may input various types of data or order a processing operation for the information processing apparatus 900 by operating the input device 906. A sound input device such as a microphone can form, for example, the acquisition section 110 illustrated in FIG. 5.

The output device 907 is formed by a device that may visually or aurally notify the user of acquired information. As such devices, there is a display device such as a CRT display device, a liquid crystal display device, a plasma display device, an EL device, a laser projector, an LED projector or a lamp, a sound output device such as a speaker and a headphone, a printer device and the like. The output device 907 outputs results acquired through various processes performed by the information processing apparatus 900, for example. Specifically, the display device visually displays results acquired through various processes performed by the information processing apparatus 900 in various forms such as text, images, tables and graphs. On the other hand, the sound output device converts audio signals including reproduced sound data, audio data and the like into analog signals and aurally outputs the analog signals. The sound output device can form, for example, the output section 130 illustrated in FIG. 5.

The storage device 908 is a device for data storage, formed as an example of a storage section of the information processing apparatus 900. For example, the storage device 908 is realized by a magnetic storage device such as an HDD, a semiconductor storage device, an optical storage device, a magneto-optical storage device or the like. The storage device 908 may include a storage medium, a recording device for recording data on the storage medium, a reading device for reading data from the storage medium, a deletion device for deleting data recorded on the storage medium and the like. The storage device 908 stores programs and various types of data executed by the CPU 901, various types of data acquired from the outside and the like. The storage device 908 can form, for example, the coefficient vector holding unit 123 illustrated in FIG. 5.

The drive 909 is a reader/writer for storage media and is included in or externally attached to the information processing apparatus 900. The drive 909 reads information recorded on a removable storage medium such as a magnetic disc, an optical disc, a magneto-optical disc or a semiconductor memory mounted thereon and outputs the information to the RAM 903. In addition, the drive 909 can write information on the removable storage medium. The drive 909 can form the acquisition section 110 and/or the output section 130 illustrated in FIG. 5.

The connection port 911 is an interface connected with external equipment and is a connector to the external equipment through which data may be transmitted through a universal serial bus (USB) and the like, for example. The connection port 911 can form the acquisition section 110 and/or the output section 130 illustrated in FIG. 5.

The communication device 913 is a communication interface formed by a communication device for connection to a network 920 or the like, for example. The communication device 913 is a communication card or the like for a wired or wireless local area network (LAN), long term evolution (LTE), Bluetooth (registered trademark) or wireless USB (WUSB), for example. In addition, the communication device 913 may be a router for optical communication, a router for asymmetric digital subscriber line (ADSL), various communication modems or the like. For example, the communication device 913 may transmit/receive signals and the like to/from the Internet and other communication apparatuses according to a predetermined protocol, for example, TCP/IP or the like. The communication device 913 can form the acquisition section 110 and/or the output section 130 illustrated in FIG. 5.

Further, the network 920 is a wired or wireless transmission path of information transmitted from devices connected to the network 920. For example, the network 920 may include a public circuit network such as the Internet, a telephone circuit network or a satellite communication network, various local area networks (LANs) including Ethernet (registered trademark), a wide area network (WAN) and the like. In addition, the network 920 may include a dedicated circuit network such as an internet protocol-virtual private network (IP-VPN).

Hereinbefore, an example of a hardware configuration capable of realizing the functions of the information processing apparatus 900 according to the present embodiment is shown. The respective components may be implemented using universal members, or may be implemented by hardware specific to the functions of the respective components. Accordingly, according to a technical level at the time when the embodiments are executed, it is possible to appropriately change hardware configurations to be used.

In addition, a computer program for realizing each of the functions of the information processing apparatus 900 according to the present embodiment as described above may be created, and may be mounted in a PC or the like. Furthermore, a computer-readable recording medium on which such a computer program is stored may be provided. The recording medium is a magnetic disc, an optical disc, a magneto-optical disc, a flash memory, or the like, for example. Further, the computer program may be delivered through a network, for example, without using the recording medium.

<<6. Summary>>

With reference to FIGS. 1 to 17, one embodiment of the present disclosure has been described in detail. As described above, the information processing apparatus 100 according to the present embodiment acquires an observation signal obtained by observing sound, and separates an acquired observation signal into a plurality of separated signals corresponding to a plurality of sound sources by applying a non-linear function to a matrix product of an input vector and a coefficient vector corresponding to each of a plurality of assumed sound sources. The information processing apparatus 100 can reproduce a complicated spectrogram of sound and the like, which are difficult to be reproduced in a linear operation of the basis vector T and the combination vector V using NMF, with higher accuracy by applying a non-linear function. As a result, the information processing apparatus 100 can improve separation performance more than the separation technology using NMF. A sound quality of a separated signal can improve, for example, a separated signal without an auditory discomfort can be output, by improving the separation performance. In addition, the information processing apparatus 100 can reproduce a complicated spectrogram using the small number of coefficient vectors (corresponding to the number of bases of the basis vector in NMF) by applying a non-linear function. As a result, a reduction in the amount of operation is expected as compared to the separation technology using NMF.

In addition, a decoder having a multi-layer structure may be used for the generation of a separated signal, more particularly the generation of an intermediate separated signal in the present embodiment. Due to the decoder having a multi-layer structure, it is possible to reproduce a complicated spectrogram with higher accuracy.

In addition, a frame work of a neural network is used in the present embodiment. For the neural network, a library (for example, Theano, cuda-convnet, cuBLAS, Caffe, or the like) and the like optimized in many types of hardware (for example, a graphics processing unit (GPU), a field-programmable gate array (FPGA), and the like) are provided. For this reason, the sound source separation technology according to the present embodiment can be easily implemented and operated at high speed.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, an example in which an auto-encoder is used as an example of the neural network has been described in the embodiment described above, but the present technology is not limited to the example. For example, a function as the decoder described above may also be realized by other types of neural networks.

Moreover, the information processing apparatus 100 according to the present embodiment can be realized in various devices. For example, the information processing apparatus 100 can be realized as a smart phone, an IC recorder, an external microphone of a game machine, or other devices using sound recognitions. In addition, the sound separation technology described above may also be provided as an application. For example, the sound source separation technology described above can be provided as a noise removal function for conference speech recording, a hands-free phone call, a voice conversation system, or a voice command input. In addition, the sound source separation technology described above can be provided as an automatic musical score collection system or an individual separation function of sound (that is, musical instrument) included in a musical piece concerning a localization operation for each musical instrument.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing apparatus including:

an acquisition section configured to acquire an observation signal obtained by observing a sound; and a sound source separation section configured to separate the observation signal acquired by the acquisition section into a plurality of separated signals corresponding to a plurality of assumed sound sources by applying a non-linear function to a matrix product of an input vector and a coefficient vector corresponding to each of the plurality of sound sources.

(2)

The information processing apparatus according to (1), in which the coefficient vector is learned in advance as a decoder of an auto-encoder.

(3)

The information processing apparatus according to (2), in which the coefficient vector corresponding to a certain sound source is learned by inputting an observation signal for learning obtained by observing a sound output from the sound source to an auto-encoder.

(4)

The information processing apparatus according to any one of (1) to (3), in which the sound source separation section sets a result of the application of a non-linear function to the matrix product of the coefficient vector and the input vector as a new input vector with respect to a plurality of the coefficient vectors, and recursively repeats the application of a non-linear function to the matrix product of the coefficient vector and the input vector.

(5)

The information processing apparatus according to any one of (1) to (4), in which the sound source separation section sequentially updates the input vector on the basis of a relationship between the observation signal and the plurality of separated signals.

(6)

The information processing apparatus according to (5), in which the sound source separation section generates an initial value of the input vector by inputting the observation signal to an encoder which is learned together with a decoder.

(7)

The information processing apparatus according to (5), in which the sound source separation section generates an initial value of the input vector using a random number.

(8)

The information processing apparatus according to any one of (5) to (7), in which the sound source separation section sequentially updates the input vector such that an error between the observation signal and a signal obtained by combining intermediate separated signals, obtained by applying a non-linear function to the matrix product of the coefficient vector and the input vector, with respect to the plurality of sound sources is decreased.

(9)

The information processing apparatus according to (8), in which the error is a square error between an amplitude spectrum of each frequency at each time of the observation signal converted into a time-frequency domain and a sum of amplitude spectrums of each frequency at each time of the intermediate separated signals of a plurality of time-frequency domains obtained with respect to the plurality of sound sources.

(10)

The information processing apparatus according to any one of (1) to (9), in which the sound source separation section generates the separated signal by converting a signal obtained by multiplying an amplitude spectrum of each frequency at each time of the observation signal converted into a time-frequency domain by a value, obtained by dividing an amplitude spectrum of each frequency at each time of an intermediate separated signal of the time-frequency domain obtained by applying a non-linear function to the matrix product of the coefficient vector and the input vector by a sum of amplitude spectrums of each frequency at each time of a plurality of the intermediate separated signals obtained with respect to the plurality of sound sources, into a signal of a time domain.

(11)

The information processing apparatus according to any one of (1) to (9), in which the sound source separation section generates the separated signal by converting an intermediate separated signal of a time-frequency domain obtained by applying a non-linear function to the matrix product into a signal of a time domain.

(12)

An information processing method which is executed by a processor, including:

acquiring an observation signal obtained by observing a sound; and separating the acquired observation signal into a plurality of separated signals corresponding to a plurality of assumed sound sources by applying a non-linear function to a matrix product of an input vector and a coefficient vector corresponding to each of the plurality of sound sources.

(13)

A recording medium having a program recorded thereon, the program causing a computer to function as:

an acquisition section configured to acquire an observation signal obtained by observing a sound; and a sound source separation section configured to separate the observation signal acquired by the acquisition section into a plurality of separated signals corresponding to a plurality of assumed sound sources by applying a non-linear function to a matrix product of an input vector and a coefficient vector corresponding to each of the plurality of sound sources.

REFERENCE SIGNS LIST 100 information processing apparatus
110 acquisition section
120 sound source separation section
121 time frequency conversion unit
122 intermediate separated signal generation unit
123 coefficient vector holding unit
124 error calculation unit
125 input vector updating unit
126 separated signal calculation unit
127 time frequency inverse conversion unit
130 output section

The invention claimed is:

1. An information processing apparatus comprising:
processing circuitry configured to:
acquire an observation signal obtained by observing a sound;
separate the acquired observation signal into a plurality of separated signals corresponding to a plurality of assumed sound sources by applying a non-linear function to a matrix product of an input vector and a coefficient vector corresponding to each of the plurality of sound sources; and
sequentially update the input vector such that an error between the observation signal and a signal obtained by combining intermediate separated signals, obtained by applying a non-linear function to the matrix product of the coefficient vector and the input vector, with respect to the plurality of sound sources is decreased.

2. The information processing apparatus according to claim 1,
wherein the coefficient vector is learned in advance as a decoder of an auto-encoder.

3. The information processing apparatus according to claim 2,
wherein the coefficient vector corresponding to a certain sound source is learned by inputting an observation signal for learning obtained by observing a sound output from the sound source to an auto-encoder.

4. The information processing apparatus according to claim 1,
wherein the processing circuitry is configured to set a result of the application of a non-linear function to the matrix product of the coefficient vector and the input vector as a new input vector with respect to a plurality of the coefficient vectors, and to recursively repeat the application of a non-linear function to the matrix product of the coefficient vector and the input vector.

5. The information processing apparatus according to claim 1,
wherein the processing circuitry is configured to sequentially update the input vector on a basis of a relationship between the observation signal and the plurality of separated signals.

6. The information processing apparatus according to claim 5,
wherein the processing circuitry is configured to generate an initial value of the input vector by inputting the observation signal to an encoder which is learned together with a decoder.

7. The information processing apparatus according to claim 5,
wherein the processing circuitry is configured to generate an initial value of the input vector using a random number.

8. The information processing apparatus according to claim 1,
wherein the error is a square error between an amplitude spectrum of each frequency at each time of the observation signal converted into a time-frequency domain and a sum of amplitude spectrums of each frequency at each time of the intermediate separated signals of a plurality of time-frequency domains obtained with respect to the plurality of sound sources.

9. An information processing apparatus comprising:
processing circuitry configured to:
acquire an observation signal obtained by observing a sound;
separate the acquired observation signal into a plurality of separated signals corresponding to a plurality of assumed sound sources by applying a non-linear function to a matrix product of an input vector and a coefficient vector corresponding to each of the plurality of sound sources; and
generate the separated signal by converting a signal obtained by multiplying an amplitude spectrum of each frequency at each time of the observation signal converted into a time-frequency domain by a value, obtained by dividing an amplitude spectrum of each frequency at each time of an intermediate separated signal of the time-frequency domain obtained by applying a non-linear function to the matrix product of the coefficient vector and the input vector by a sum of amplitude spectrums of each frequency at each time of a plurality of the intermediate separated signals obtained with respect to the plurality of sound sources, into a signal of a time domain.

10. An information processing apparatus comprising:
processing circuitry configured to:
acquire an observation signal obtained by observing a sound;
separate the acquired observation signal into a plurality of separated signals corresponding to a plurality of assumed sound sources by applying a non-linear function to a matrix product of an input vector and a coefficient vector corresponding to each of the plurality of sound sources; and
generate the separated signal by converting an intermediate separated signal of a time-frequency domain obtained by applying a non-linear function to the matrix product into a signal of a time domain.

11. An information processing method which is executed by a processor, comprising:
acquiring an observation signal obtained by observing a sound;
separating the acquired observation signal into a plurality of separated signals corresponding to a plurality of assumed sound sources by applying a non-linear function to a matrix product of an input vector and a coefficient vector corresponding to each of the plurality of sound sources; and
sequentially updating the input vector such that an error between the observation signal and a signal obtained by combining intermediate separated signals, obtained by applying a non-linear function to the matrix product of the coefficient vector and the input vector, with respect to the plurality of sound sources is decreased.

12. A non-transitory computer readable recording medium having a program recorded thereon, the program causing a computer to perform an information processing method comprising:
acquiring an observation signal obtained by observing a sound;
separating the acquired observation signal into a plurality of separated signals corresponding to a plurality of assumed sound sources by applying a non-linear function to a matrix product of an input vector and a coefficient vector corresponding to each of the plurality of sound sources; and
sequentially updating the input vector such that an error between the observation signal and a signal obtained by combining intermediate separated signals, obtained by applying a non-linear function to the matrix product of the coefficient vector and the input vector, with respect to the plurality of sound sources is decreased.

* * * * *